(12) United States Patent
Forutanpour et al.

(10) Patent No.: US 9,170,674 B2
(45) Date of Patent: Oct. 27, 2015

(54) GESTURE-BASED DEVICE CONTROL USING PRESSURE-SENSITIVE SENSORS (71) Applicant: QUALCOMM Incorporated, San Diego, CA (US)

(72) Inventors: Babak Forutanpour, Carlsbad, CA (US); Richard O. Farley, San Diego, CA (US); Shivakumar Balasubramanyam, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 119 days.

(21) Appl. No.: 13/827,709

(22) Filed: Mar. 14, 2013

(65) Prior Publication Data

US 2013/0265229 A1 Oct. 10, 2013

Related U.S. Application Data (60) Provisional application No. 61/621,833, filed on Apr. 9, 2012.

(51) Int. Cl.
G06F 3/033 (2013.01)
G06F 3/041 (2006.01)
G06F 3/01 (2006.01)
G06F 3/0346 (2013.01)
(Continued)

(52) U.S. Cl.
CPC .............. *G06F 3/0414* (2013.01); *G06F 3/014* (2013.01); *G06F 3/015* (2013.01); *G06F 3/017* (2013.01); *G06F 3/0346* (2013.01); *G08C 17/02* (2013.01); *G08C 21/00* (2013.01); *G08C 2201/32* (2013.01)

(58) Field of Classification Search
CPC ....... G06F 3/0414; G06F 3/014; G06F 3/015; G06F 3/017; G06F 3/0346; G08C 21/00; G08C 17/02; G08C 2201/32
USPC ...................... 345/156–158; 700/83; 715/863
See application file for complete search history.

(56) References Cited

U.S. PATENT DOCUMENTS 6,244,873 B1 * 6/2001 Hill et al. ....................... 434/236
6,325,768 B1   12/2001 Williams et al.
6,515,669 B1 * 2/2003 Mohri ............................ 345/474
(Continued)

FOREIGN PATENT DOCUMENTS

WO     2011055326 A1    5/2011

OTHER PUBLICATIONS

International Search Report and Written Opinion—PCT/US2013/034917—ISA/EPO—Oct. 1, 2013.
(Continued)

*Primary Examiner* — Rodney Amadiz
(74) *Attorney, Agent, or Firm* — Kilpatrick Townsend & Stockton LLP (57) ABSTRACT

Embodiments of the present invention are directed toward controlling electronic devices based on hand gestures detected by detecting the topography of a portion of a user's body. For example, pressure data indicative of a user's bone and tissue position corresponding to a certain movement, position, and/or pose of a user's hand may be detected. An electromyographic (EMG) sensor coupled to the user's skin can also be used to determine gestures made by the user. These sensors can be coupled to a camera that can be used to capture images, based on recognized gestures, of a device. The device can then be identified and controlled.

36 Claims, 6 Drawing Sheets (51) Int. Cl.
 *G08C 17/02* (2006.01)
 *G08C 21/00* (2006.01)

(56) References Cited

U.S. PATENT DOCUMENTS

| | | | | |
|---|---|---|---|---|
| 6,965,842 | B2 * | 11/2005 | Rekimoto | 702/150 |
| 7,596,393 | B2 | 9/2009 | Jung et al. | |
| 8,170,656 | B2 | 5/2012 | Tan et al. | |
| 8,280,503 | B2 | 10/2012 | Linderman | |
| 8,447,704 | B2 * | 5/2013 | Tan et al. | 706/12 |
| 8,620,146 | B1 * | 12/2013 | Coleman | 386/278 |
| 8,937,589 | B2 * | 1/2015 | Wei et al. | 345/156 |
| 9,009,594 | B2 * | 4/2015 | Schwesinger et al. | 715/716 |
| 9,037,530 | B2 * | 5/2015 | Tan et al. | 706/62 |
| 2002/0186200 | A1 * | 12/2002 | Green | 345/156 |
| 2004/0063481 | A1 * | 4/2004 | Wang | 463/8 |
| 2004/0125076 | A1 * | 7/2004 | Green | 345/156 |
| 2008/0136775 | A1 * | 6/2008 | Conant | 345/156 |
| 2009/0231269 | A1 * | 9/2009 | Ueshima et al. | 345/156 |
| 2009/0293631 | A1 | 12/2009 | Radivojevic | |
| 2009/0327171 | A1 | 12/2009 | Tan et al. | |
| 2010/0259472 | A1 | 10/2010 | Radivojevic | |
| 2011/0107216 | A1 * | 5/2011 | Bi | 715/716 |
| 2011/0138444 | A1 * | 6/2011 | Kang et al. | 726/3 |
| 2012/0127070 | A1 * | 5/2012 | Ryoo et al. | 345/156 |
| 2012/0162409 | A1 * | 6/2012 | Setiawan et al. | 348/135 |

OTHER PUBLICATIONS

Lu Z., et al., "A Prototype of Gesture-based Interface", MOBILEHCI 2011, Aug. 30-Sep. 2, 2011, Stockholm, Sweden, Aug. 30, 2011, pp. 33-35, XP055010527.

Partial International Search Report—PCT/US2013/034917—ISA/EPO—Jul. 22, 2013.

* cited by examiner

GESTURE-BASED DEVICE CONTROL USING PRESSURE-SENSITIVE SENSORS

CROSS-REFERENCES TO RELATED APPLICATIONS

The present application claims benefit under 35 USC 119(e) of U.S. Provisional Application No. 61/621,833, entitled "Control of Remote Device using Real Time Modeling of Bone and Tissue Position," filed on Apr. 9, 2012 which is assigned to the assignee hereof and expressly incorporated herein by reference.

BACKGROUND

Many electronic devices are useful to control remotely. Common examples include televisions, set top boxes, DVRs, media players (e.g., CD players, DVD players, Blu-ray players), tablets, desktop and laptop computers, and teleconferencing equipment. Currently, common ways for a user to control such equipment is to use a remote control device such as might be used with a television. This can be inconvenient in several ways. First, it requires the user to possess a remote control device. Second, the remote control device which needs to be used may only work with a specific piece of equipment, so multiple remote control devices may be needed for locations with multiple devices that can be controlled remotely.

SUMMARY

Embodiments of the present invention are directed toward controlling electronic devices based on hand gestures detected by detecting the topography of a portion of a user's body. For example, pressure data can be indicative of a user's bone and tissue position corresponding to a certain movement, position, and/or pose of a user's hand. An electromyographic (EMG) sensor coupled to the user's skin can also be used to determine gestures made by the user. These sensors can be coupled to a camera that can be used to capture images, based on recognized gestures, of a device. The device can then be identified and controlled.

An example system for controlling a device based on hand gestures, according to the disclosure, includes a pressure-sensitive sensor configured to detect a topography of a portion of a body of a user and provide pressure data to a processing module, which is configured to identify a gesture associated with the topography of the portion of the body of the user based on the pressure data. The system also includes a transmitter configured to transmit information to the device based on the identified gesture.

An example method for controlling a device based on gestures, according to the description, includes collecting pressure data that indicates a topography of a portion of a body of a user, identifying a gesture associated with the topography of the portion of the body of the user based on the pressure data, and transmitting information to the device based on the identified gesture.

An example non-transitory computer-readable medium, according to the disclosure, has instructions embedded thereon for controlling a device based on gestures. The instructions include computer-executable code for collecting pressure data that indicates a topography of a portion of a body of a user, identifying a gesture associated with the topography of the portion of the body of the user based on the pressure data, and transmitting information to the device based on the identified gesture.

An example system for controlling a device based on gestures, according to the description, includes means for collecting pressure data that indicates a topography of a portion of a body of a user, means for identifying a gesture associated with the topography of the portion of the body of the user based on the pressure data, and means for transmitting information to the device based on the identified gesture.

Items and/or techniques described herein may provide one or more of the following capabilities, as well as other capabilities not mentioned. Techniques can provide for selecting and controlling any of a variety of devices using a system with a wearable form factor that is much less likely to get lost than a traditional remote control. Furthermore, the system can include and/or be integrated with a separate device, such as a mobile phone, head-mounted display, and the like, for additional functionality. These and other embodiments, along with many of its advantages and features, are described in more detail in conjunction with the text below and attached figures.

DETAILED DESCRIPTION

The following description is provided with reference to the drawings, where like reference numerals are used to refer to like elements throughout. While various details of one or more techniques are described herein, other techniques are also possible. In some instances, structures and devices are shown in block diagram form in order to facilitate describing various techniques.

Hand gestures performed by a user may be used to control multiple different remote devices, such as a mobile phone, computer, head-mounted display, television, and/or other electronic devices. When a user performs a gesture with a hand, various characteristics of the user's body can be detected in order to identify the gesture. When a user performs a hand gesture, such as making a fist, the movement and/or position of bones, ligaments, skin, and/or other tissue may be specific to the gesture. In other words, based on the movement and/or position of bones, ligaments, skin, and/or other tissue, it can be determined that the user is making a fist. Such characteristics may be evident in multiple places on the user's body. For instance, on the back of the user's hand that is being used to make the gesture, movement and/or positions of the hand's metacarpals may be used to identify gestures. As another example, positions of bones, ligaments, skin, and/or other tissue on the user's wrist (of the same hand being used to make the gesture) may be used to identify the gesture performed.

Figure 1:
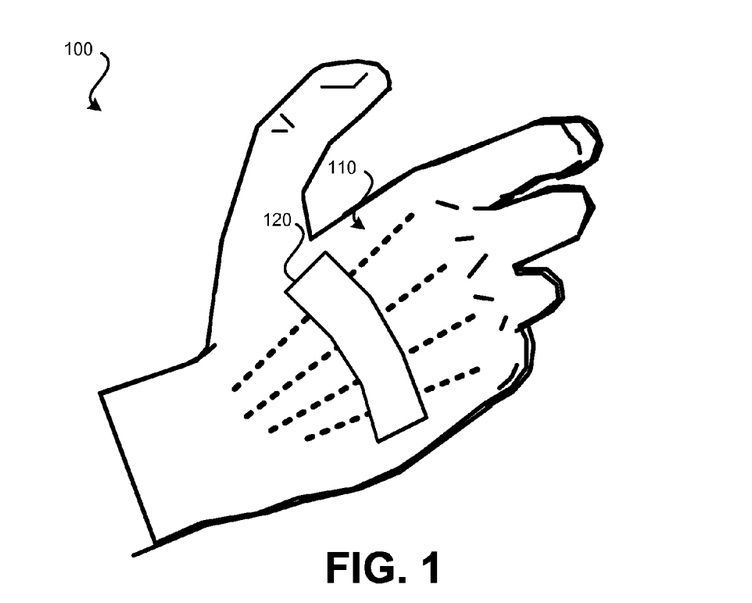
FIG. 1. is an illustration of an embodiment of a user's hand with a pressure sensor attached.

FIG. 1 illustrates an embodiment 100 of a user's hand with a pressure sensor attached. Pressure sensor 120 may be affixed to the back of the user's hand 110. In some embodiments, the sensor 120 may be configured as a band that encircles the hand or a strip for placement across the back of the hand, for example as illustrated in FIG. 1. Dotted lines are used to represent the approximate location of the hand's metacarpal bones. Pressure sensor 120 may be configured to generally detect the topography of the back of the user's hand 110. The topography of the back of the user's hand 110 may be affected by the position of bones (e.g., metacarpal bones), ligaments, skin, and/or other tissue of the user's hand. Gestures performed by the user's hand may result in topographies of the back of the user's hand 110 being present that can be used to identify the gestures. Gestures which may be identified based on the topography of the user's hand include: touching the user's thumb to a finger (with a different gesture being present for each finger); forming a fist; and forming a fist and flexing the user's wrist up, down, left, or right (each being a separate gesture). Additional gestures may be possible. Pressure sensor 120 may collect pressure data for multiple points on the back of the user's hand 110. This pressure data may be transmitted to another device for analysis. Pressure sensor 120 may be affixed to the back of the user's hand 110 via an adhesive, band, or some other means for attachment.

In other embodiments, in addition to or rather than using a pressure sensor to detect the topography of the back of the user's hand, electrical activity present in the muscles in the user's hand may be detected via electromyography (EMG). It may be possible to determine the gestures performed by the user's hand using the detected electrical activity. As such, an EMG sensor may use one or more electrodes to detect the electrical activity present on the back of the user's hand (or in some other location, such as on the user's forearm).

Figure 2:
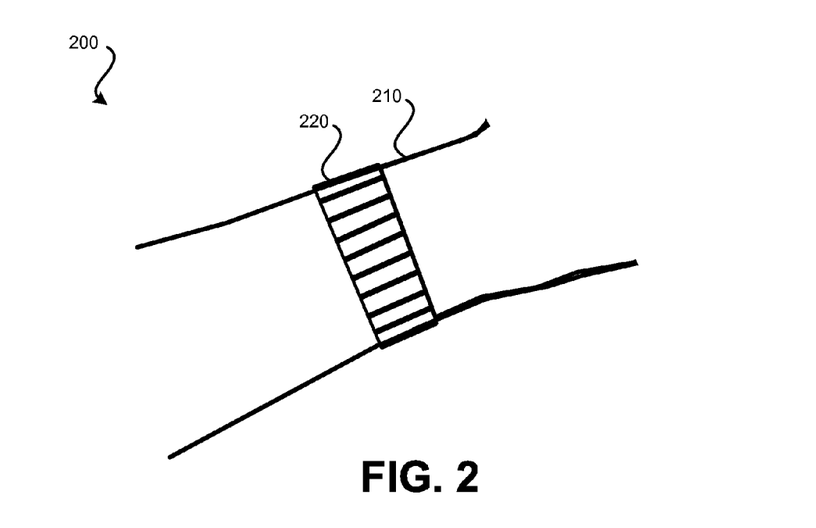
FIG. 2 is an illustration an embodiment of a user's wrist with a pressure sensor attached.

FIG. 2 illustrates an embodiment 200 of a user's wrist with a pressure sensor attached. Similar to embodiment 100 of FIG. 1, various gestures performed by the user's hand may be detected using the topography of the user's wrist. Topography of an entire circumference of the wrist may be detected or just a portion, such as the underside of the user's wrist. Embodiment 200 illustrates pressure sensor 220 being used to determine the topography of the underside of a user's wrist 210. The topography of the user's wrist 210 may be affected by the position of bones, ligaments, skin, and/or other tissue of the user's wrist 210. A gesture being performed by the user's hand may result in a topography of the user's wrist 210 being present that can be used to identify the gesture. Gestures which may be identified based on the topography of the user's wrist 210 include: touching the user's thumb to a finger (with a different gesture being present for each finger); forming a fist; and forming a fist and flexing the user's wrist up, down, left, or right (each being a separate gesture). Pressure sensor 220 may be affixed to the user's wrist 210 via an adhesive, band (e.g., a watchband), or some other means for attachment.

The embodiments illustrated in FIGS. 1 and 2 are for example purposes only. Embodiments may utilize multiple pressure sensors, which may include the use of multiple pads or strips being attached to a hand or wrist of the user. For example, two sensors 120 may be affixed to the back of the user's hand 110 and data from both sensors 120 may be used to determine the topography and/or an associated gesture. In some embodiments, a plurality of sensors enables the detection of more complex gestures and/or detection of gestures with an increased confidence. Other form factors may also be used, such as square, circular, etc. In some embodiments, a square sensor that pad that covers at least an amount of area that multiple sensor strips would cover is used in place of the multiple sensor strips.

Figure 3:
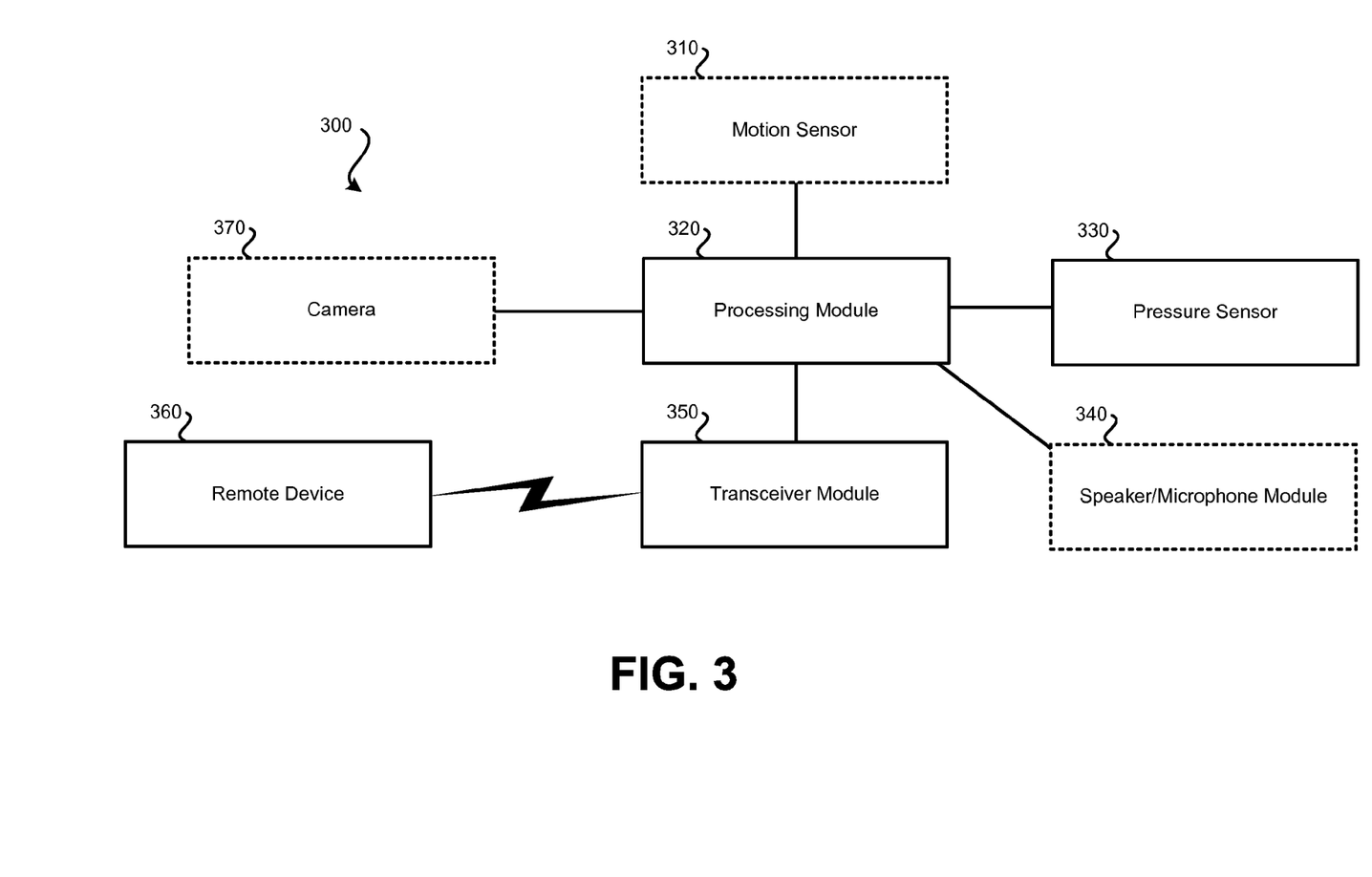
FIG. 3 is a block diagram illustrating an embodiment of a system for designating and/or controlling devices using hand gestures.

FIG. 3 illustrates an embodiment of system 300 in block diagram form. System 300 may be configured to control one or more remote devices using hand gestures. System 300 may include: motion sensor 310, processing module 320, pressure sensor 330, speaker/microphone module 340, transmitter module 350, camera 370, and remote device 360. Pressure sensor 330 may be as described in relation to FIGS. 1 and 2. In some embodiments, in addition to or rather than a pressure sensor, one or more electromyography (EMG) sensors may be used to measure the electrical activity of muscles on the back of the user's hand and/or the user's wrist (or, more specifically, the underside of the user's wrist). One or more EMG sensors may additionally or alternatively be used on the user's forearm. Pressure sensor 330 may be a polymer-based or capacitive-based sensor that is configured to measure pressure of multiple points. For instance, pressure sensor 330 may be configured to measure a grid of individual points in a particular region on the user's body (e.g., wrist, back of hand). In some embodiments, pressure sensor 330 comprises a linear potentiometer.

Motion sensor 310 is optional and may include an accelerometer and/or a gyroscope. Motion of a part of the user's body (e.g., the user's hand and/or wrist) may be used in conjunction with pressure measurements to determine a gesture. For instance, a gesture may include forming a fist (which may be detected based on pressure measurements), while the motion of the fist, such as toward or away from the user's body, may be determined based on motion data collected by motion sensor 310. As an example of when such a gesture could be useful, consider a zoom function for a remote device. The user forming a fist may activate the zoom function. Moving the fist toward the user's body may zoom out, and moving the fist away from the user's body may zoom in. As another example, a gesture of touching the user's thumb to a finger (e.g., index finger) may be a gesture to activate cursor control. Motion sensor 310 may then be used to detect whether the user's hand is moved left, right, up, or down. Movement of the cursor may mimic the motion of the user's hand.

Additionally or alternatively, the motion of a hand can be coupled with the hand's position to correspond to various different functions, depending on the remote device being controlled and/or the state of the remote device being controlled. In some embodiments, a user may roll or bend his or her wrist a certain direction to evoke a function, which can be combined with hand and/or arm movement to control the function. For example, bending the wrist upward can evoke a "move cursor" functionality in which hand and/or arm movement moves the cursor, bending the wrist downward can evoke a "highlight text" functionality in which hand and/or arm movement can be used to select the text to be highlighted, bending the wrist leftward can evoke a "scroll" functionality in which hand and/or arm movement can be used to control scrolling (e.g., scroll in a direction of the movement), and bending the wrist rightward can evoke "zoom" functionality in which hand and/or arm movement can be used to control the zoom (e.g., forward to zoom in, backward to zoom out). Other combinations are possible, as are transpositions of the above wrist bend directions and functions.

Additionally or alternatively, cursor movement and/or other functions may be performed without input from the motion sensor 320. In some embodiments, cursor movement may be controlled by hand positions. For example, touching the thumb to the index finger can move the cursor up, touching the thumb to the middle finger can move the cursor down, touching the thumb to the ring finger can move the cursor left, and touching the thumb to the pinky finger can move the cursor right. Other cursor movements are possible, as are transpositions of the above hand positions and functions. Further, other functions, such as selecting an icon, can be performed by touching the thumb to all fingers.

Processing module 320 may analyze collected motion data and/or pressure data from motion sensor 310 and pressure sensor 330, respectively. Processing module 320 may determine a gesture that is being performed by the user's hand based on the motion data and/or the pressure data.

Speaker/microphone module 340 is optional and may be used to provide information to the user and receive information from the user. For instance, if the user is in a location where multiple remote devices are available for control, the speaker may be used to inform the user of the available remote devices and receive a selection (via the microphone) of which remote device the user desires to control. In some embodiments, rather than the user speaking into a microphone to specify which remote device he desires to control, the selection may be based on a gesture performed by the user (that is detected using motion sensor 310 and/or pressure sensor 330). This data may be used to determine what command should be transmitted by transceiver module 350 in response to a detected gesture. Speaker/microphone module 340 may provide information to processing module 320 that indicates which remote device should be controlled.

In other embodiments, the remote device may be selected based on which remote device the user points the gesture at. For such embodiments, a camera 370 may be integrated into the system 300, and/or may be included on the remote device or user's body, for example. If the user is wearing augmented reality goggles, heads-up display or other head-mounted display, it may be possible to identify the remote device that the user is looking at or that the user is pointed at. A gesture performed by the user may be used to activate a function specific to the augmented reality goggles, heads-up display or other head-mounted display or the gesture may result in the transmission of a command to a remote device.

Camera 370 may enable remote device designation using any of a variety of gestures. In one embodiment, for example, some or all of the components of system 300, including the camera 370, can be integrated into a wristband or other accessory worn on a user's hand, wrist, and/or arm, and configured with the camera facing away from the user to take an image of where the user is pointing. The capturing of the image can be triggered by a recognized gesture of the hand or arm (e.g., pointing, snapping fingers, etc), such that the user can perform a gesture directed toward a device to be controlled, and the camera can capture an image of the device based on the gesture. The image may then be processed to identify which device the user wants to control, and the wristband can couple wirelessly with the identified device. Additional detail regarding device designation using camera 370 is provided below with regard to FIG. 6. Alternative means for capturing an image may be utilized, such as video and/or still image camera, light sensor(s), and the like.

Additionally or alternatively, gesture-based image capture can be utilized to provide other functionality. Embodiments may utilize gesture-based image capture to provide, for example, an image-based Internet search that allows a user to capture an image of an object and conduct an Internet search based on the captured image. Depending on desired functionality, search results can be audibly read to the user, or evoked on a communicatively connected device (e.g., mobile phone, head-mounted display, etc.).

Transceiver module 350 can comprise a wireless transmitter and receiver, configured to transmit commands to the remote device 360 desired to be controlled and/or receive information from the remote device 360 and/or other devices. Transceiver module 350 may use infrared, RF, Bluetooth, WiFi, or some other form of wireless communication to communicate with the remote device 360. Such communication may include commands for moving of a cursor position or performing a function (e.g., zoom, move, copy, paste, delete, channel up/down, volume up/down, hang-up, pick-up, etc.). A command transmitted to remote device 360 may be selected by processing module 320 based on the remote device 360 being controlled and/or an identified gesture. In other embodiments, transceiver module 350 may be configured to communicate with the remote device 360 or a wired interface. For example, a hand or wrist sensor may be wired to a head mounted display.

Figure 4:
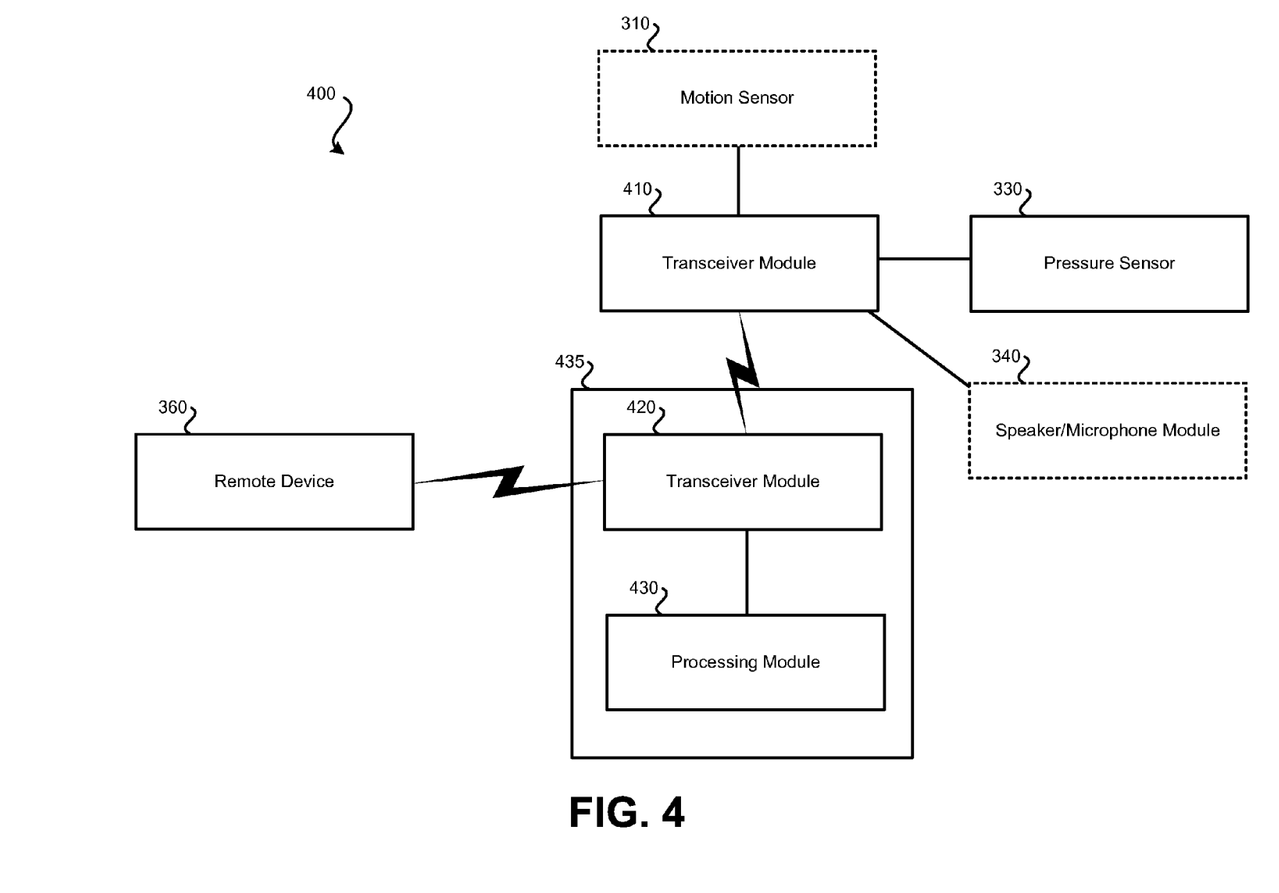
FIG. 4 is a block diagram illustrating another embodiment of a system for designating and/or controlling devices using hand gestures.

FIG. 4 illustrates an embodiment of a system 400 in block diagram form. System 400 may be configured to control one or more remote devices using hand gestures. System 400 may include: motion sensor 310, pressure sensor 330, transceiver module 410, speaker/microphone module 340, and mobile device 435. Mobile device 435 may include transceiver module 420 and processing module 430. Motion sensor 310, pressure sensor 330, and speaker/microphone module 340 may be as described in relation to FIGS. 1 through 3. Rather than a processing device being physically connected with the sensors, a separate device may be used to process the motion data and pressure data from motion sensor 310 and pressure sensor 330, respectively. For example, the processing abilities of the user's mobile phone may be used to determine the gesture being performed using the motion data and/or the pressure data. Transceiver module 410 may relay raw motion data and/or raw pressure data to mobile device 435.

Transceiver module 420 of mobile device 435 may receive the raw motion data and/or pressure data and provide such data to processing module 430 for analysis. Processing module 430, which may be executing an application configured to process the motion data and/or pressure data, may determine a gesture being performed by the user based on such data from motion sensor 310 and pressure sensor 330. Based on the determined gesture, a command to be sent to remote device 360 may be identified. Transceiver module 420 may transmit the command to remote device 360 wirelessly. The wireless communication link between remote device 360 and transceiver module 420 may use a different protocol and/or frequency than the wireless communication link between transceiver module 420 and transceiver module 410. For instance, Bluetooth may be used for communication between transceiver module 410 and transceiver module 420 while WiFi or infrared may be used between transceiver module 420 and remote device 360.

In some embodiments, rather than processing module 430 of FIG. 4 or processing module 320 of FIG. 3 identifying which command remote device 360 should perform based on the determined gesture, an indication of the gesture performed may be transmitted to remote device 360 such that remote device 360 determines a command that corresponds to the identified gesture. As such, some of the processing may be performed by remote device 360. In yet additional embodiments, motion data and/or pressure data may be transmitted to remote device 360 such that the remote device determines a gesture that the user performed with his hand based on the raw data. Such embodiments may require a decreased amount of processing by processing module 320 or processing module 430.

Figure 5:
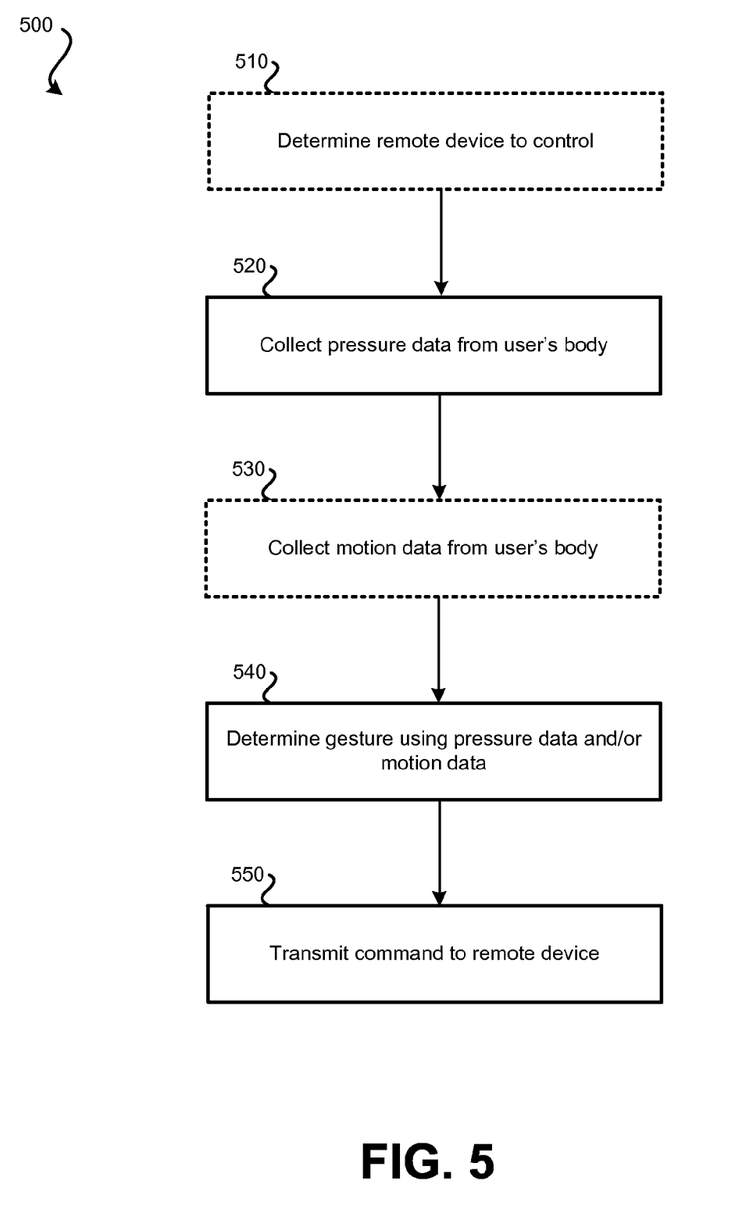
FIG. 5 is a flow diagram illustrating an embodiment of a method for controlling one or more remote devices based on hand gestures.

FIG. 5 illustrates an embodiment of a method 500 for controlling one or more remote devices using hand gestures. Method 500 may be performed using the pressure sensor configurations of FIGS. 1 and 2. Method 500 may be performed using the systems of FIG. 3 or 4 or some other system configured to permit control of one or more remote devices using hand gestures. At optional step 510, if multiple remote devices are present that can be controlled, a particular remote device may be selected. This may occur in several ways. In one embodiment a speaker and microphone (such as the speaker/microphone module 340 of FIGS. 3 and 4) can be used to audibly ask a user which remote device to control. The user may then speak an indication of the remote device desired to be controlled. In some embodiments, the user may be presented a menu. For example, if the user is wearing a display device, such as a heads-up display or augmented reality device, a menu identifying the available remote devices may be presented to the user and may allow the user to select a remote device to control. The remote device may be selected based on which remote device the user is pointing at or that the user is facing. Such embodiments may utilize a camera (such as the camera 370 of FIG. 3) that is observing where the user is pointing or facing. As such, such a camera may be mounted on the user, on the remote device, or at some other location within the vicinity of the user. In some embodiments, the user may perform a hand gesture that identifies the remote device to be controlled. The hand gesture may be detected, for example, with the pressure sensor 330, camera 370, and/or motion sensor 330 of FIGS. 3 and 4. A gesture may be linked to a remote device such that when the gesture is sensed as having been performed, control of that remote device is activated.

A selection of available devices to control may be created in any of a manner of different ways, depending on desired functionality. For example, historical data from configuration and/or prior pairing of wristband or other control system (such as systems 300 and/or 400 of FIGS. 3 and 4, respectively) with one or more remote devices can be used to create the selection of available devices, which can be stored, updated, and utilized for subsequent device selection. Furthermore, wireless beaconing from remote devices (e.g., in accordance with Bluetooth, AllJoyn™, and/or other technologies utilized to control the remote devices) can indicate to a wristband or other control system which remote devices may be available to control.

The selection of available devices to control may be prioritized based on usage, user preferences, and/or other factors. As indicated previously a user may select a device by using a hand gesture. In a prioritized list, for example, the user touching one of the fingers to the thumb could indicate which number of list to select. In some configurations, there could be a default device and a certain gesture could select the default while another gesture could select a different device. The selection of available devices can be location based, such that, when a user walks into a room, the wristband or other control system can detect which devices it can control in that room. If there is only one device, the wristband or other control system may automatically pair with that device. If there are multiple devices found, the user may select from a list using, for example, one of the previously-discussed techniques (e.g., audible selection, hand gestures, etc.).

Some embodiments may allow a user to perform an engagement gesture, which can enable a user to continue to control the selected remote device over a period of time until a triggering event, such as a disengagement gesture, is detected. For example, rather than pointing to a remote device to be controlled, a user may make a "grabbing" gesture (e.g., closing an open hand to a fist) toward the device, enabling the user to perform several gestures in a row. When the user is finished controlling device, the user can make a "drop" gesture (e.g., spreading all 5 fingers coming out, away from the palm in a motion opposite the grabbing motion) to disengage control of the remote device. Other triggering events that could end the user's control of a device could include the passage of a certain period of time, a period of inactivity, the user leaving a room in which the device is located, and/or other events. Engagement and/or disengagement gestures may vary depending on device, user preferences, and/or other factors.

At step 520, pressure data may be collected from the user using one or more pressure sensors, such as the pressure sensor 330 of FIGS. 3 and 4, illustrated in FIGS. 1 and 2. Such pressure data may be collected from a wrist (or, more specifically, the underside of the user's wrist) of the user and/or the back of the user's hand. The pressure data may indicate a topography of the user's wrist and/or hand. The topography of the user's wrist and/or back of the user's hand may be affected by the position of the user's hand. As such, if the user performs a gesture with his hand, the topography of the user's wrist (of the same hand) and/or back of the user's (same) hand may correspond to the gesture being performed. Based on the topography of the user's wrist and/or back of the user's hand, the gesture of the user's hand may be determined.

At optional step 530, motion data may be collected using a motion sensor (e.g., the motion sensor 310 of FIGS. 3 and 4), which may include an accelerometer or gyroscope. The motion data may indicate motion of a part of the user's body, such as the user's wrist or hand. Motion data may be collected at the same location on the user's body where pressure data is collected. Such motion data may be used to identify motion-based portions of a gesture.

At step 540, a gesture may be identified based on the pressure data and/or the motion data collected at steps 520 and 530, respectively. For instance, a particular hand position may be identified using the pressure data collected at step 520, while the motion of the user's hand may be identified using the motion data collected at step 530. An example of this may be cursor movement. The user may form a grip (such as a fist) that indicates he desires to control a cursor; the user may then move his hand left, right, up, or down while making the fist to control the cursor. Optionally, gestures may recreate the functionality of a computer mouse. For example, motion of hand could move a cursor around, and a grab gesture could select ("click") an object. A finger-to-thumb gesture could be the equivalent of a "right click." Additionally or alternatively, the bending of a wrist could provide control of a cursor. For example, after detecting a fist, bending the wrist in a certain direction while the hand is making the fist (as indicated by pressure data) may cause the cursor to move around. Wrist bending may also be used to perform other actions, such as entering text using a text-selection interface, such as Snapkeys®. As indicated previously, gestures and functionality may vary. Gesture identification can be performed by a processing module, such as the processing modules 320 and/or 430 of FIGS. 3 and 4 respectively.

At step 550, a command may be transmitted to the remote device that indicates an action the remote device is to perform in response to the determined gesture. For example, referring to the cursor example, the command may indicate that the cursor should move up or down and/or left or right. The command transmitted at step 550 may be contingent on the determined gesture and the remote device that is being controlled. As such, the same gesture may result in the transmission of a different command for a different remote device. The command may be transmitted using, for example, the transceiver modules 350 and/or 420 of FIGS. 3 and 4 respectively.

Figure 6:
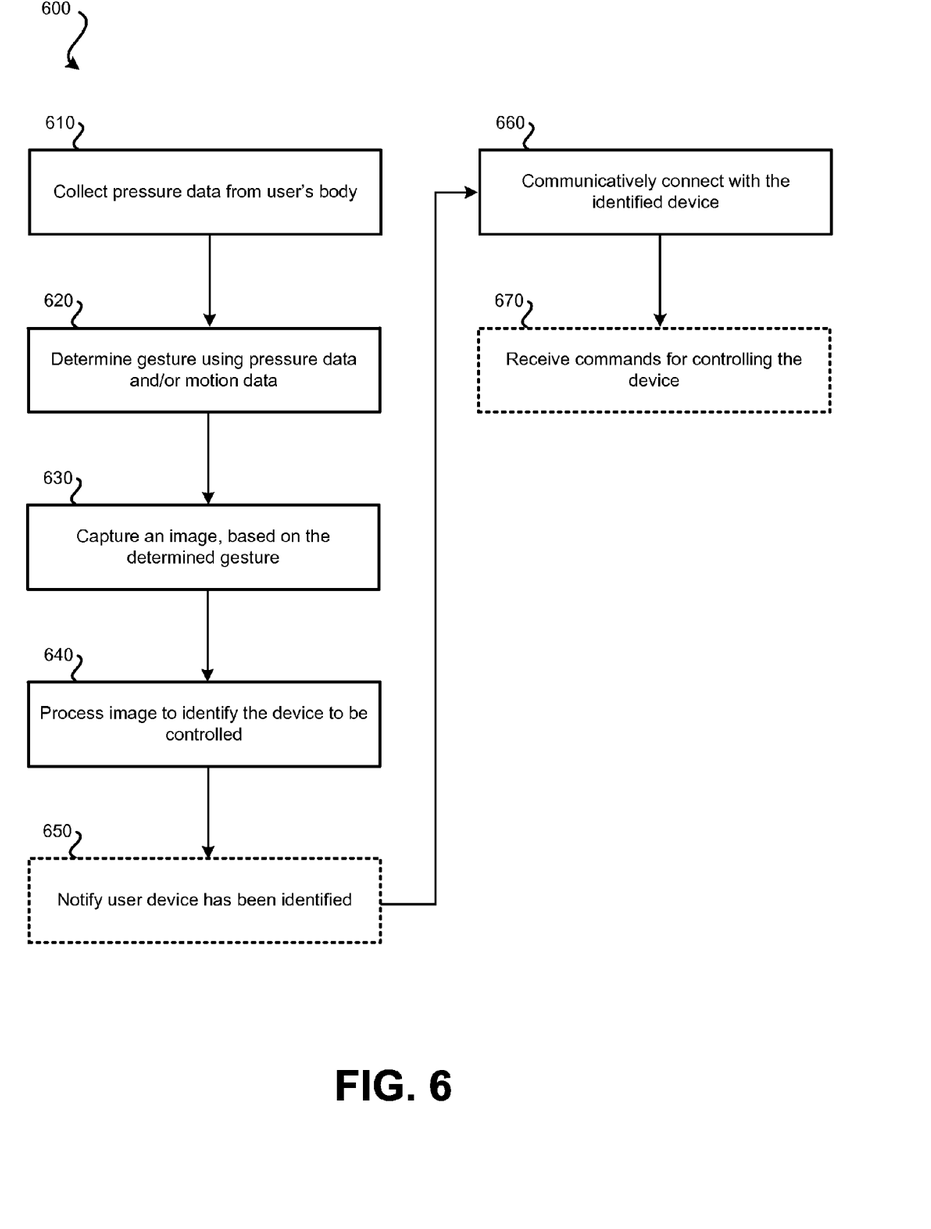
FIG. 6 is a flow diagram illustrating an embodiment of a method for designating one or more remote devices for control.

Similar functionality can be used to designate one or more remote devices for control. FIG. 6 illustrates a method 600 for making such a designation, according to one embodiment. One or more of the steps in FIG. 6 can be performed using a system configured to permit control of one or more remote devices using hand gesture, such as the systems of FIG. 3 or 4. Similar to steps illustrated in FIG. 5, method 600 can include, at step 610, collecting pressure data from a user's body and, at step 620, determining a gesture using pressure data and/or motion data. Again, pressure data can be obtained from one or more pressure sensors, such as the pressure sensor 330 of FIGS. 3 and 4, illustrated in FIGS. 1 and 2.

Although a gesture can be any combination of movement, positioning, and/or posing of the user's hand and/or arm, here, certain gestures may be utilized that enable a user to direct a camera toward the device to be controlled. For a wristband with an outward-facing camera, for example, such gestures could include snapping the fingers, pointing, making a fist, and the like, while generally pointing at the device such that the device is within the field of view of the camera. At step 630, once a gesture for image capture is determined, the camera (e.g., the camera 370 of FIG. 3) captures an image.

At step 640, the image is processed to identify the device to be controlled. Some embodiments may utilize one or more identifiers (e.g., sticker, emblem, or other visible tag) to facilitate the identification of a device. Additionally or alternatively, processing the image may include comparing the image or features or keypoints thereof with a database of known objects stored during an earlier calibration stage. The earlier calibration stage may involve the user capturing one or more images of the device and inputting identifying information about the device. The captured image or extracted features and/or keypoints may be transmitted to a remote device to process, for example to a visual search provider. In cases where a device is not identifiable via image processing, the selection may be confirmed using another technique (e.g., audible confirmation). Additionally or alternatively, the selection may be confirmed or ambiguity in captured images resolved using the image in combination with information regarding devices within range to control (e.g., devices available for Bluetooth pairing) and/or historical data (e.g., indicating a probability that a user wants to control a particular device, given the user's history). Means for performing step 640 can include any combination of hardware and software, including the processing modules 320 and 430 of FIGS. 3 and 4 respectively.

At step 650, the user may optionally be notified once the device has been identified, indicating to the user that the image capture was successful. Such a notification can include a noise or other audio indicator (e.g., a beep, a voice saying the name of the device (using, for example, the speaker/microphone module 340 of FIGS. 3 and 4), etc.), haptic feedback, image (if the user has a head-mounted or other display), and the like. Additionally or alternatively, the user can receive a notification once the device is ready to be controlled.

At step 660, the system communicatively connects with the identified device. The connection can be made using a wireless communication interface, such as the transceiver module 350 of FIGS. 3 and 4. Methods for connecting can vary, depending on the type of technology used. Connecting via Bluetooth, for example, may involve selecting, from a list of connections of available Bluetooth devices, the connection corresponding to the device identified at step 640. The system can then communicatively connect with the identified device using Bluetooth paring protocol. Other wireless technologies may involve different connection processes. The connection can be made using, for example, the transceiver modules 350 and/or 420 of FIGS. 3 and 4 respectively.

Optionally, at step 670, commands for controlling the device may be received. For example, different gestures may be mapped to different functions, depending on the identified device to be controlled (e.g., rotating a hand clockwise may increase volume of a radio, change the channel of a television, scroll up in a displayed list, etc.). Depending on the functionality of the device, the device itself may provide the commands, which can be provided in XML or another format enabling the mapping of gestures to commands. Additionally or alternatively, commands may be retrieved from a database, separate from the identified device, that provides commands, protocols, and/or other information necessary to communicate with and control the device. The commands may be received using, for example, the transceiver modules 350 and/or 420 of FIGS. 3 and 4 respectively.

It should be appreciated that the specific steps illustrated in FIGS. 5 and 6 provide example methods 500, 600 of controlling one or more remote devices based on hand gestures and designating one or more remote devices for control, respectively. Alternative embodiments may include alterations to the embodiments shown. Additional features may be added, removed, performed simultaneously, combined, and/or otherwise altered depending on the particular applications. One of ordinary skill in the art would recognize many variations, modifications, and alternatives.

Figure 7:
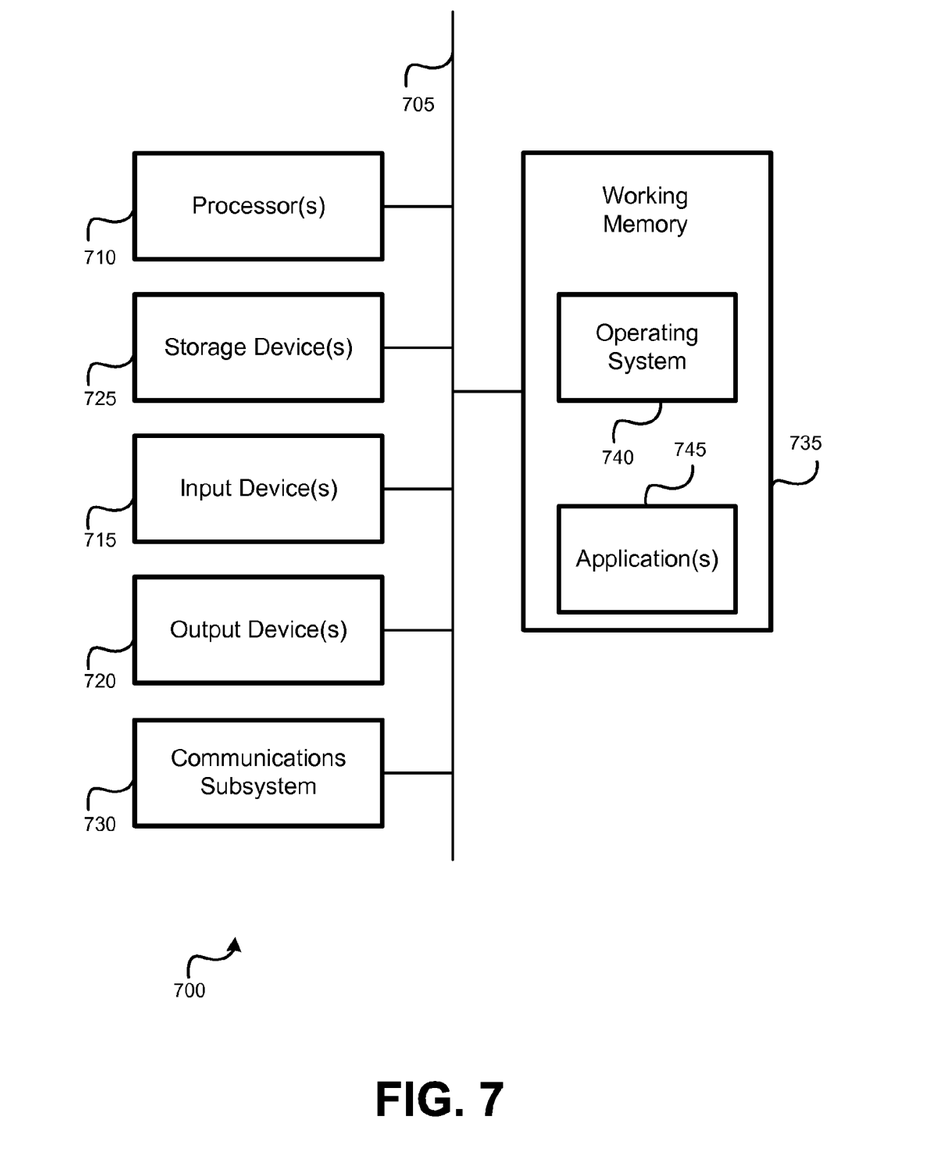
FIG. 7 illustrates an embodiment of a computer system.

FIG. 7 illustrates an embodiment of a computer system 700, which may implement some or all of the components of the systems of FIGS. 3 and 4. Additionally, a computer system 700 can represent at least some of the components of the remote devices discussed in this application. FIG. 7 provides a schematic illustration of one embodiment of a computer system 700 that can perform portions of the methods provided by various other embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a mouse, a keyboard, pressure sensor, EMG sensor, camera, microphone, and/or the like; and one or more output devices 720, which can include without limitation a display device, a printer, a speaker, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700, and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

As indicated previously, elements of computer system 700 may be reflected within system 300 and system 400 of FIGS. 3 and 4, respectively. For example, processor(s) 710 may perform some or all of the processing functions of processing modules 320 and 430 of FIGS. 3 and 4. Likewise communication subsystem 730 may include transceiver modules 350, 410, and/or 420. In particular, transceiver modules 350, 410, and/or 420 can include one or more receivers and/or transmitters of the communication subsystem 730, which can be configured to communicate using any of a variety of wired and wireless technologies. Similarly, input device(s) 715 may include the motion sensor 310, pressure sensor 330, speaker/microphone module 340, and/or camera 370. Additionally or alternatively, the motion sensor 310, pressure sensor 330, speaker/microphone module 340, and/or camera 370 may communicate with the computer system 700 via the communications subsystem 730.

The methods, systems, and devices discussed above are examples. Various configurations may omit, substitute, or add various procedures or components as appropriate. Although embodiments may describe designating and/or controlling "remote" devices, such devices can be proximate to the user. The distance between a user and a device can vary for different instances and scenarios. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A system for controlling a device based on hand gestures, the system comprising:
   a camera;
   a pressure-sensitive sensor configured to detect a topography of a portion of a body of a user and provide pressure data to a processing module;
   the processing module configured to:
      identify a first gesture associated with the topography of the portion of the body of the user based on a first pressure data;
      cause the camera to capture an image of the device subsequent to identifying the first gesture;
      identify the device using the image of the device captured by the camera; and
      identify a second gesture associated with the topography of the portion of the body of the user based on a second pressure data and
   a transmitter configured to transmit information to the device based on the identified second gesture.

2. The system for controlling the device based on hand gestures of claim 1, wherein:
   the portion of the body of the user is a back of a hand of the user; and
   the pressure-sensitive sensor is configured to detect the topography of the back of the hand as affected by metacarpal position.

3. The system for controlling the device based on hand gestures of claim 1, wherein:
   the portion of the body of the user is a wrist of the user; and
   the pressure-sensitive sensor is configured to detect the topography of at least a portion of the wrist.

4. The system for controlling the device based on hand gestures of claim 1, further comprising:
   a motion sensor configured to detect motion of the user and transmit motion data to the processing module.

5. The system for controlling the device based on hand gestures of claim 4, wherein:
   the processing module is further configured to identify the second gesture using the motion data.

6. The system for controlling the device based on hand gestures of claim 4, wherein the motion sensor comprises at least one of an accelerometer or a gyroscope.

7. The system for controlling the device based on hand gestures of claim 1, wherein the portion of the body of the user comprises a forearm of the user.

8. The system for controlling the device based on hand gestures of claim 1, further comprising an electromyographic sensor.

9. The system for controlling the device based on hand gestures of claim 1, further comprising a receiver configured to receive, from the device, information indicative of commands for controlling the device using hand gestures.

10. The system for controlling the device based on hand gestures of claim 1, further comprising a second pressure-sensitive sensor configured to detect a topography of a second portion of the body of the user and provide a third pressure data to the processing module, wherein the processing module is further configured to identify the second gesture using the third pressure data.

11. The system for controlling the device based on hand gestures of claim 1, wherein the identified second gesture comprises a closed fist.

12. The system for controlling the device based on hand gestures of claim 1, wherein the identified second gesture comprises a finger touching a thumb.

13. The system for controlling the device based on hand gestures of claim 1, wherein the identified second gesture comprises a wrist being flexed such that the hand moves up, down, left, or right.

14. A method for controlling a device based on gestures, the method comprising:
   collecting a first pressure data that indicates a topography of a portion of a body of a user;
   identifying a first gesture associated with the topography of the portion of the body of the user based on the first pressure data
   causing a camera to capture an image of the device subsequent to identifying the first gesture;
   identifying the device using the image;
   collecting a second pressure data that indicates the topography of the portion of the body of the user;
   identifying a second gesture associated with the topography of the portion of the body of the user based on the second pressure data; and
   transmitting information to the device based on the identified second gesture.

15. The method for controlling the device based on gestures of claim 14, wherein:
   the portion of the body of the user is a back of a hand of the user; and
   the collecting comprises collecting pressure data using a pressure-sensitive sensor configured to collect the pressure data that indicates the topography of the back of the hand as affected by metacarpal position.

16. The method for controlling the device based on gestures of claim 14, wherein:
   the portion of the body of the user is a wrist of the user; and
   the collecting comprises collecting pressure data using a pressure-sensitive sensor configured to collect the pressure data that indicates the topography of at least a portion of the wrist.

17. The method for controlling the device based on gestures of claim 14, further comprising detecting motion of the user.

18. The method for controlling the device based on gestures of claim 17, wherein identifying the second gesture is further based on the detected motion.

19. The method for controlling the device based on gestures of claim 17, further comprising detecting the motion of the user with at least one of an accelerometer or a gyroscope.

20. The method for controlling the device based on gestures of claim 14, wherein the portion of the body of the user comprises a forearm of the user.

21. The method for controlling the device based on gestures of claim 14, wherein identifying the second gesture is further based on information from an electromyographic sensor.

22. The method for controlling the device based on gestures of claim 14, further comprising collecting a third pressure data from a second portion of the body, wherein identifying the second gesture is further based on the third pressure data.

23. The method for controlling the device based on gestures of claim 14, wherein the identified second gesture comprises a closed fist.

24. The method for controlling the device based on gestures of claim 14, wherein the identified second gesture comprises a finger touching a thumb.

25. The method for controlling the device based on gestures of claim 14, wherein the identified second gesture comprises a wrist being flexed such that the hand moves up, down, left, or right.

26. A non-transitory computer-readable medium having instructions embedded thereon for controlling a device based on gestures, the instructions including computer-executable code for:
   collecting a first pressure data that indicates a topography of a portion of a body of a user;
   identifying a first gesture associated with the topography of the portion of the body of the user based on the first pressure data;
   causing a camera to capture an image of the device subsequent to identifying the first gesture;
   identifying the device using the image;
   collecting a second pressure data that indicates the topography of the portion of the body of the user;
   identifying a second gesture associated with the topography of the portion of the body of the user based on the second pressure data; and
   transmitting information to the device based on the identified second gesture.

27. A system for controlling a device based on gestures, the system comprising:
   means for collecting a first pressure data that indicates a topography of a portion of a body of a user;
   means for identifying a first gesture associated with the topography of the portion of the body of the user based on the first pressure data;
   means for capturing an image of the device subsequent to identifying the first gesture;
   means for identifying the device using the image;
   means for collecting a second pressure data that indicates the topography of the portion of the body of the user;
   means for identifying a second gesture associated with the topography of the portion of the body of the user based on the second pressure data; and
   means for transmitting information to the device based on the identified second gesture.

28. The system for controlling a device based on gestures of claim 27, wherein the means for identifying the second gesture includes means for identifying the second gesture associated with the topography of a back of a hand of the user.

29. The system for controlling a device based on gestures of claim 27, wherein the means for identifying the second gesture includes means for identifying the second gesture associated with a wrist of the user.

30. The system for controlling a device based on gestures of claim 27, further comprising:
   means for detecting motion of the user; and
   means for further basing the identifying the second gesture on the detected motion.

31. The system for controlling a device based on gestures of claim 27, wherein the means for identifying the second gesture includes means for identifying the second gesture associated with the topography of a forearm of the user.

32. The system for controlling a device based on gestures of claim 27, including means for further basing the identifying the second gesture on information from an electromyographic sensor.

33. The system for controlling a device based on gestures of claim 27, further comprising means for collecting a third pressure data from a second portion of the body, wherein identifying the second gesture is further based on the third pressure data.

34. The system for controlling a device based on gestures of claim 27, wherein the means for identifying the second gesture comprise means for identifying a closed fist.

35. The system for controlling a device based on gestures of claim 27, wherein the means for identifying the second gesture comprise means for identifying a finger touching a thumb.

36. The system for controlling a device based on gestures of claim 27, wherein the means for identifying the second gesture comprise means for identifying the flexing a wrist such that the hand moves up, down, left, or right.

\* \* \* \* \*